United States Patent Office 3,312,531
Patented Apr. 4, 1967

3,312,531
COMPOSITION AND PROCESS
Margot Becke, Heidelberg, Germany, assignor to Olin Mathieson Chemical Corporation, a corporation of Virginia
No Drawing. Filed Aug. 8, 1962, Ser. No. 215,507
4 Claims. (Cl. 23—357)

This invention relates to $PNS_2O_5Cl_4$ as a novel composition of matter and to novel processes for producing it.

The novel compound $PNS_2O_5Cl_4$ appears to have the structural formula $ClSO_2OPCl_2:N \cdot SO_2Cl$. The novel process of preparing the compound comprises acting on polymers of phosphonitrilic chloride with sulfur trioxide ($SO_3$) and hydrogen chloride (HCl). The $SO_3$ and HCl may conveniently be introduced in combined form as chlorosulfonic acid ($ClSO_3H$) or they may be introduced separately. The polymeric $(PNCl_2)_n$ starting materials can be the crude mixtures obtained in known manner by the reaction of $PCl_5$ and $NH_4Cl$, purified trimer, tetramer, etc. Preferably the $n$ in $(PNCl_2)_n$ is about 3 to 7.

The process of this invention in the case of the trimer appears to proceed according to the equation

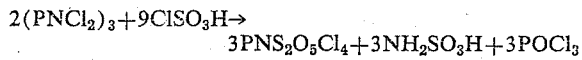

More generally the equation appears to be:

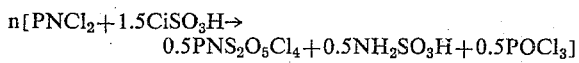

where $n$ is the number of monomeric $(PNCl_2)$ units in the polymer. In the case of the tetramer, the equation becomes:

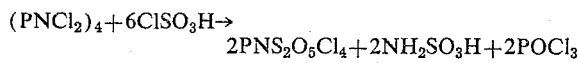

When the $SO_3$ and HCl are supplied separately, at least one molar proportion of each is introduced per mole of monomer. When the $SO_3$ and HCl are supplied as $ClSO_3H$, at least one molar proportion is introduced per mole of monomer. Since the stoichiometry requires 1.5 moles of chlorosulfonic acid (or 1.5 $SO_3$+1.5 HCl) per monomeric unit of $PNCl_2$, it is more advantageous to introduce at least the stoichiometric amount. An excess of as much as 5:1 or more of $ClSO_3H$ or its components per $PNCl_2$ unit can be used but smaller excesses are ordinarily satisfactory.

The reaction proceeds slowly and sometimes requires up to 30 days at room temperature (about 15° C.) but it proceeds more rapidly at temperatures up to about 100° C. Preferred conditions are about 70 to 100° C. for 5 to 15 hours. The reaction is carried out at atmospheric pressure or at higher or lower pressures. Ordinarily no solvent is required.

The $PNS_2O_5Cl_4$ product is separated from the reaction mixture in any suitable manner. The by-product

is conveniently removed by filtering and the by-product $POCl_3$ and any excess $ClSO_3H$ by vacuum distilling. The product $PNS_2O_5Cl_4$ is then vacuum distilled leaving any unreacted polymeric $(PNCl_2)_n$ as a residue. The product boils at 55 to 56° C. at 0.02 mm., at 57 to 58° C. at 0.03 mm. and at 63 to 64° C. at 0.1 mm.

The novel compound is quite soluble in benzene, nitrobenzene, carbon tetrachloride, chloroform, bromoform and phosphorus oxychloride. In the latter solvent, it apparently dissociates, showing a molecular weight considerably below theoretical for the undissociated molecule. In bromoform the molecular weight is normal. The $PNS_2O_5Cl_4$ product melts below minus 80° C. It decomposes at 150° C. at atmospheric pressure forming a dark brown colored product. The novel compound is hydrolyzed by sulfuric acid, formic acid and is decomposed after several days by atmospheric moisture forming sulfamic acid and other products. This makes the novel compound a vigorous, immediate herbicide which is eventually converted to compounds acting as fertilizer and not permanently rendering the soil unsuitable for the growth of plants.

The $PNS_2O_5Cl_4$ compounds reacts with concentrated nitric acid, decomposing with the formation of nitrous gases. It does not appear to react with concentrated hydrochloric acid. With 30 percent caustic it reacts explosively with the formation of considerable amounts of white solid. Vigorous reaction occurs with sodium peroxide with which it inflames and forms white solids. The odor of sulfur dioxide is noticeable.

Example I $PNS_2O_5Cl_4$ was prepared by the reaction of trimeric phosphonitrilic chloride with chlorosulfonic acid in a 100 milliliter flask fitted with a reflux condenser and capillary inlet tube. The top of the reflux condenser was connected to a trap cooled with carbon dioxide-methanol connected in turn to a long calcium chloride tube leading to a water aspirator. The flask was charged with 20 grams of thoroughly dried trimeric phosphonitrilic chloride, evacuated and filled with dry nitrogen at atmospheric pressure several times. Finally between 50 and 60 milliliters of vacuum-distilled chlorosulfonic acid was introduced. The capillary was supplied with dry nitrogen and thus access of atmospheric moisture was avoided. Then the pressure was reduced to 12 to 15 mm. The flask and contents were heated by means of a glycerol bath to 70 to 80° C. and maintained at this temperature for 10 to 15 hours. Finally the excess chlorosulfonic acid was distilled off in a vacuum at a bath temperature of 100 to 110° C. The sulfamic acid which was precipitated was removed by filtering through a fritted glass filter previously treated with nitrogen dried over phosphorus pentoxide. The filtrate was distilled in a high vacuum at a bath temperature between 95 and 105° C. The principal fraction distilled as a colorless liquid boiling at 55 to 56° C. at 0.02 mm. The product was re-distilled three times to obtain a yield of 21.8 grams or 76.5 percent of theory. During the reaction 7.3 grams of phosphorus oxychloride condensed in the cold trap. The sulfamic acid was thoroughly washed with absolute carbon tetrachloride and dried in vacuum over potassium hydroxide and phosphorus pentoxide. A yield of 1.6 grams of sulfamic acid was obtained. The phosphorus oxychloride and sulfamic acid were identified by ultimate analysis. The analytical results on the principal product were as follows:

*Analysis.*—Theoretical for $PNS_2O_5Cl_4$: Cl, 42.9; P, 9.3; N, 4.2; S, 19.3. Found: Cl, 40.4, 42.9, 42.1, 39.9, 40.4; P, 9.3, 9.0, 9.7, 9.6, 8.9; N, 4.3, 4.4, 4.3; S, 18.6, 18.4, 18.8, 20.0, 19.8.

The molecular weight was determined cryoscopically in phosphorus oxychloride and found to be 203 compared with a theoretical value of 331. The compound dissociates in this solvent.

Example II

The $PNS_2O_5Cl_4$ product was obtained by the reaction of trimeric phosphonitrilic chloride with sulfur trioxide and hydrogen chloride. To each of 3 heavy walled glass tubes having a length of about 500 millimeters and an internal diameter of 10 millimeters was introduced 5 grams of trimeric phosphonitrilic chloride. The tubes and contents were thoroughly dried. Sulfur trioxide obtained from 65 percent oleum was introduced into each tube in the stoichimetrically calculated amount of 3.5 grams per 5 grams of phosphonitrilic chloride. The tubes were closed with a capillary tube and allowed to stand over night. During this time the contents of each tube crystallized to a glass-like mass. By means of liquid nitrogen, 10 milliliters of liquid hydrogen chloride was condensed in each tube. The tubes were sealed, the liquid nitrogen was removed and the tubes were allowed to stand at room temperature. The hydrogen chloride vaporized above the glassy phosphonitrilic chloride-sulfur trioxide solid. After 10 days the contents turned to a thin liquid. After 22 days the tubes were cooled with carbon dioxide-methanol and then with liquid air. The tubes were opened and excess hydrogen chloride was evaporated. During this process, the amount of precipitate increased considerably in volume. The contents of the tubes were combined and the precipitate was removed on a fritted glass filter, washed with carbon tetrachloride, dried and analyzed. A yield of 4.3 grams of sulfamic acid was obtained. The filtrate was distilled under vacuum to remove 6.5 grams of phosphorus oxychloride which was condensed in a trap cooled with liquid air. Then 5.2 grams of 24.2 percent of theory of a colorless distillate boiling at 55° C. at 0.02 mm. was obtained. A residue of 7.4 grams remained behind. Analysis of the distillate showed the following values:

Theoretical for $PNS_2O_5Cl_4$: Cl, 42.9; P, 9.3; N, 4.2; S, 19.3. Found: Cl, 41.1, 41.1; P, 8.9, 9.5; N, 4.1, 4.2; S, 19.3, 19.3.

*Example III*

A phosphonitrilic trimer-sulfur trioxide adduct having the formula $(PNCl_2)_3 3SO_3$ was prepared by introducing 20 grams of trimeric phosphonitrilic chloride into a 100 milliliter flask and adding the calculated amount of liquid sulfur trioxide (13.8 grams). The sealed flask was allowed to stand over night. The flask was fitted with a reflux condenser carrying a drying tube to prevent access of atmospheric moisture. Then 20 grams of freshly distilled chlorosulfonic acid was added. Using a magnetic stirrer, the contents were mixed to form a clear non-viscous liquid. The temperature of the reaction mixture rose rapidly to 87° C. With stirring the temperature was maintained at 80 to 90° C. for 7 hours. The clear reaction mixture became turbid and finally a precipitate formed which was filtered off on a sintered glass filter and was identified as sulfamic acid. It amounted to 5.5 grams. The filtrate was distilled in vacuum and boiled at 57 to 58° C. under 0.03 mm. The yield after three distillations amounted to 7 grams or 24.5 percent of theory. In the trap 2.3 grams of phosphorus oxychloride condensed. Analytical results are shown in the following table:

Theoretical for $PNS_2O_5Cl_4$: Cl, 42.9; P, 9.3; N, 4.2; S, 19.3. Found: Cl, 40.1, 40.9; P, 8.8, 8.8; N, 4.2, 3.8; S, 19.8, 19.6.

The molecular weight in bromoform was found to be 341 and 345 compared with the theoretical value of 331.

*Example IV*

When the procedure of Example I is repeated substituting tetrameric for trimeric phosphonitrilic chloride, substantially identical results are obtained.

*Example V*

When the procedure of Example I is repeated substituting crude phosphonitrilic chloride polymers (obtained from the distillation of a mixture of $PCl_5$ and $NH_4Cl$) for trimeric phosphonitrilic chloride, substantially identical results are obtained.

What is claimed is:

1. A composition of matter having the formula $PNS_2O_5Cl_4$, said composition prepared by the process of claim 2.

2. The process of preparing the compound of claim 1 which comprises reacting polymeric phosphonitrilic chloride with at least 1 molar proportion of $SO_3$ and at least 1 molar proportion of HCL per mole of monomeric unit of $PNCl_2$.

3. The process of claim 2 in which the $SO_3$ and HCl are supplied in the form of $ClSO_3H$.

4. The process of claim 2 in which the polymeric phosphonitrilic chloride has the formula $(PNCl_3)_n$ where $n$ is 3 to 7 inclusive.

References Cited by the Examiner

UNITED STATES PATENTS 3,179,489  4/1965  Becke _____ 23—14

OTHER REFERENCES

"Chemical Abstracts," vol. 45, column 1503 (1951).
Gochring et al.: "Zeitschrift fur Naturforschung," vol. 9b, page 678 (1954).

OSCAR R. VERTIZ, *Primary Examiner.*

MILTON WEISSMAN, *Examiner.*